Patented Apr. 21, 1925.

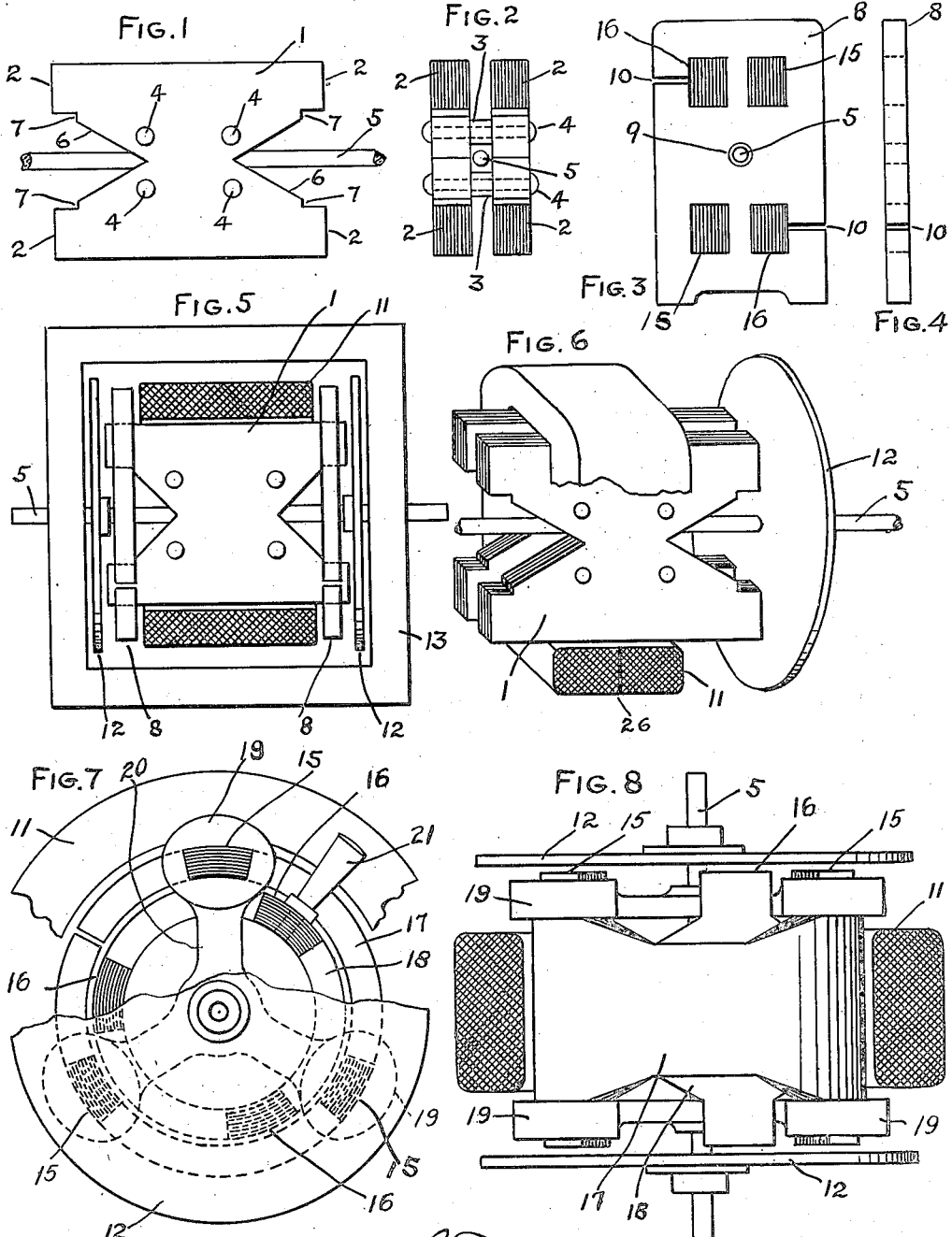

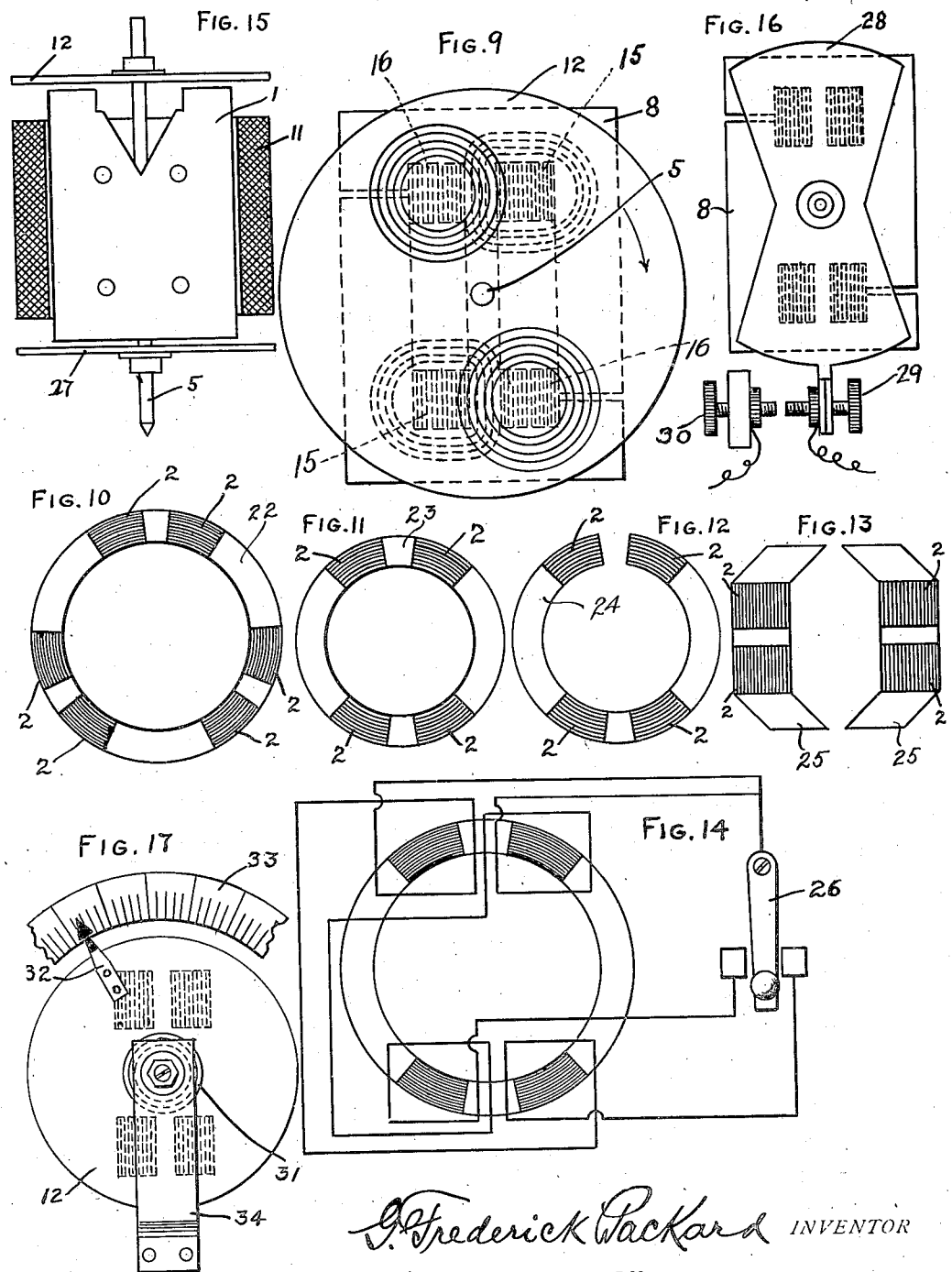

1,534,282

UNITED STATES PATENT OFFICE.

GRANVILLE F. PACKARD, OF WILKINSBURG, PENNSYLVANIA.

ELECTRIC MOTOR.

Application filed October 20, 1920. Serial No. 418,209.

*To all whom it may concern:*

Be it known that I, GRANVILLE F. PACKARD, a citizen of the United States, and a resident of Wilkinsburg, in the county of Allegheny and State of Pennsylvania, have invented a new and useful Improvement in Electric Motors, of which the following is a specification.

My invention relates to alternating-current motor devices of the induction type and particularly to devices in which the turning moment is caused by the mutual attraction between magnetic fields energized by two induced currents circulating in adjacent relatively movable parts.

One object of my invention is to provide a simple and compact motor device that shall consist of a minimum number of parts and that shall occupy minimum space.

Another object of my invention is to provide a motor device in which friction losses are substantially eliminated.

A further object of my invention is to provide a motor device in which heavier induced currents may be employed with a corresponding increase in torque without the occurrence of excessive heating.

Broadly considered, my invention consists in the application of forces to the rotor symmetrically with respect to its axis. End thrust on the rotor bearing, which is usually inherent in motor devices of this general character by reason of the reactions between adjacent magnetic poles, is eliminated by employing a rotor disc at each end of the polar system. The longitudinal forces are thus balanced.

Friction losses are substantially eliminated and a high torque may thus be produced without the employment of such heavy currents as to produce excessive heating. Ample heat conducting material and radiating surfaces are provided in both the fixed and movable parts.

The movement of the rotor is effected by the use of a novel polar system in which a plurality of poles are produced by the energization of an alternating-current coil. Certain of the poles are provided with closed secondary circuits while adjacent poles that are not so provided induce eddy currents in the rotor disc. The mutual attraction between the magnetic fields energized by the currents in secondary coils and those set up by the eddy currents in the rotor disc cause the disc to rotate.

The details of my invention will be described in connection with the accompanying drawings in which Figures 1 and 2 are side and end views, respectively, of a preferred form of magnetic structure, the rotor shaft extending therethrough. Fig. 3 is a view in end elevation of the magnetic structure of Figs. 1 and 2 with a secondary plate associated therewith. Fig. 4 is a view of an edge of the secondary plate of Fig. 3. Fig. 5 is a side view in elevation of an assembled motor, the coil being shown in section. Fig. 6 is a perspective view of certain parts of the motor of Fig. 5, parts being broken away. Figs. 7 and 8 are respectively plan and elevational views of a modification, parts being broken away in the former view, and the coil being shown in section in the latter view.

Fig. 9 is an enlarged end view of the polar system and a rotor disc of the motor of Fig. 5, the currents traversing the several parts being indicated diagrammatically. Figs. 10, 11, 12 and 13 are end views of modifications of the magnetic structure of motor of Fig. 7. Fig. 14 is a diagrammatic view of a magnetic structure with circuits and apparatus for reversing the direction of the rotor. Fig. 15 is a view, partially in section and partially in elevation of a modification. Fig. 16 is an end view of a motor employed to control an electrical circuit. Fig. 17 is a plan view of a motor adapted to operate as an electrical measuring instrument.

Referring particularly to Figs. 1 to 6, inclusive, there is provided a core member comprising a pair of groups of laminations or punchings 1 of magnetizable material, each having four polar projections 2. The groups of laminations are separated by suitable spacing members 3. The assembled parts are secured as by means of rivets 4. A rotatable shaft 5, preferably of non-magnetic material, extends through suitable openings in the spacing members.

The laminations are cut away at each end or notched, as at 6, in order to concentrate the magnetic flux at the four polar projections 2. Shoulders 7 are provided for seating secondary plates 8 which have four rectangular openings to receive the corresponding polar projections. The rotor shaft 5 extends through suitable openings 9 in the respective secondary plates.

As best shown in Figs. 3, 4 and 5, the secondary plates are continuous around one pair of diametrically opposite poles, but are provided with slits 10 to constitute air gaps in the electric circuits around the other pair of poles. The core member is energized by a coil 11 which may be connected to any suitable source of alternating current. Two discs 12 of aluminum, or other suitable conducting material, are mounted on the shaft 5 adjacent to the respective ends of the core member. A yoke member 13, Fig. 5, which is employed to complete the external magnetic circuit, may be of any suitable or desirable shape.

The operation of the arrangement shown in Figs. 1 to 6, inclusive, may best be understood by reference to Fig. 9. It will be noted that, in this view, the currents traversing the closed circuits in the secondary plate 8 around the one pair of diametrically opposite poles 15 are indicated by dotted lines. The eddy currents in the rotor disc 12 that are set up by the flux traversing the other pair of poles 16 are indicated by full lines. Eddy currents in the disc 12 will also be set up by the pair of poles 15 but, by reason of the opposing field induced by the currents in the secondary circuits, these eddy currents are of low value relatively to those indicated by full lines and may, therefore, be neglected. Since the currents in the respective members are induced by the same source of energy, they circulate in the same direction and the magnetic fields consequently attract each other. The mutual attraction between the respective pairs of adjacent magnetic fields, and the resultant tendency for them to establish coincident axes causes the disc to rotate in the direction of the arrow. The torque thus produced is applied symmetrically with respect to the axis by reason of the location of the diametrically opposite pairs of poles. There is, therefore, no force tending to change the axis of the shaft.

If the shaft 5 is provided with two discs and both ends of the core members are arranged similarly, as shown in Fig. 5, the tendency of the magnetic forces described above to produce endwise movement of the shaft 5 is counter-balanced by the forces at the opposite end of the core member that are exerted upon the second disc. Accordingly, no end thrust upon the shaft bearings is produced. The torque is, however, doubled by the use of two discs.

A modified form of my invention is shown in Figs. 7 and 8. The magnetic system comprises two concentric core members 17 and 18 each of which is constructed by winding a sheet of metal in the form of a spiral. Each core member is provided at each end with three equidistant outwardly projecting poles whose faces lie in the same plane.

The poles of the outer core member 17 are each provided with a closed secondary member 19 which corresponds in function to the secondary plate member 8 of the device shown in Figs. 1 to 6, inclusive, and Fig. 9. The secondary members 19 are connected by integral radiating arms 20. The core member 17 and the secondary members 19 are stationary.

The inner core member 18 is provided with a handle 21 by means of which the relative positions of the poles of the respective core members may be varied. The torque of the motor and its direction of rotation may be controlled by suitably adjusting the handle and the core member 18 about the shaft as an axis.

When the parts are in the relative positions in which they are illustrated, Figs. 7 and 8, the rotation of the discs 12 is in a counter-clockwise direction as viewed from above, Fig. 7. The operation is identical with that described in connection with Fig. 5 except that three pairs of poles 15 and 16 apply torque to the discs at equidistant points.

If the handle 21 is rotated in a clockwise direction to such position that the poles of the movable or inner core member 18 are adjacent to, but in a counter-clockwise direction from, the several poles of the other core member, the discs rotate in a clockwise direction, as will be readily understood. If desirable or necessary, micrometric means may be employed to secure a more accurate relative adjustment of the poles.

Reference may now be had to Fig. 10 in which the core member 22, which is provided with three pairs of poles, is a modification of the arrangement shown in Figs. 7 and 8. The poles are all on a single core member and their relative positions are accordingly fixed. Corresponding members of each pair of poles are provided with secondary members. The core member 22 is formed by winding as in the device of Figs. 7 and 8. The operation of a motor device having a core member of this form will be readily understood in view of the foregoing.

The core member 23 of the arrangement shown in Fig. 11 differs from that of Fig. 10 only in that it is provided with two pairs of poles.

The core member 24 of Fig. 12 may be formed by suitably bending a series of flat laminations of appropriate lengths.

The core members 25 of Fig. 13 may be formed in a manner similar to that for the core member 24 of Fig. 12.

It should be noted that, in the arrangements shown in Figs. 11, 12 and 13, the relations of the members of the several pairs of poles are identical whether the core member is a closed ring, is open on one side, or is in two parts, as in the respective views.

In Fig. 14, there is shown a convenient arrangement for effecting the reversal of the direction of rotation of a motor. Each pole is provided with a secondary winding, the windings for each pair of diametrically opposite poles being arranged in series. A switch 26 renders the one or the other pair of windings operative, according to its position.

When the switch 26 is actuated to the left, the poles have the same relations as the poles of the core members of Fig. 9 and they exert torque on a rotor in the same direction. When the switch is in its right-hand position, the relations of the poles are reversed and torque is exerted on an adjacent rotor in the opposite or counter-clockwise direction.

The modification illustrated in Fig. 15 is so arranged that the weight of the moving parts is substantially neutralized by magnetic attraction. Only one end of the core member is utilized to rotate the disc 12. A circular plate 27, of magnetic material, is mounted on the shaft 5 adjacent to the plane surfaces of the ends of the laminations. When the coil 11 is energized, the magnetic force exerted on the plate 27 almost balances the weight of the moving parts. End thrust on the bearing for the shaft 5 is substantially eliminated. The structure of this modification is similar in principle and in arrangement to that of Figs. 1 to 6, the fixed secondary plate 8 being omitted for the sake of clearness.

Referring to Fig. 16, the device shown therein is similar in arrangement and is identical in principle of operation with that shown in Fig. 9. The rotor 28, which carries a contact member 29, is cut away on opposite sides as these portions are not necessary by reason of the small angle of its movement. A stationary contact member 30 coacts with the movable contact member 29 to control an electrical circuit. It is obvious that the torque of the motor may be employed to positively open or to positively close an electrical circuit, the return to normal position being effected by force of gravity or by a suitable spring.

In Fig. 17, the motor is illustrated as adapted to operate as an electrical measuring instrument. The disc 12 is provided with a pointer 32 which traverses a graduated scale 33. A spiral spring 31, which tends to maintain the disc 12 in one position is fastened, at one end, to a stationary support 34.

When the axis of the motor is arranged vertically, as shown in Figs. 8 and 15, the employment of a plate of magnetic material, such as the plate 27 of Fig. 15, substantially eliminates all end thrust on the motor shaft.

If the axis of the motor is horizontal as in the motor of Fig. 5, the end thrust is eliminated by the employment of two rotors. In addition, the radiating surface is substantially double that of the older devices of similar character in which a single rotor is employed.

In certain forms of my invention, the fixed secondary members are integral and are comparatively thick in width and extensive in area in order to provide ample heat radiating surfaces. The secondary plate 8 of Fig. 3 is an example of this arrangement.

While I have shown and described my improved motor device as energized by means of a single coil, it may be energized in accordance with the resultant of the forces of two opposing coils. For example, the coil 11 of Fig. 6 may, if desired, be replaced by two coils wound to oppose each other. A partition indicated at 36 may separate two parts of the same coil or two opposing coils.

When the currents traversing two opposing coils are of equal value, the core member is not energized and no torque is produced. Torque is exerted, however, when the currents are unbalanced and the motor may be employed to indicate the degree of unbalance.

I claim as my invention:

1. An alternating-current motor comprising a magnetizable core member having a series of longitudinal polar projections, a revoluble shaft, a closed secondary member surrounding alternate polar projections, a plate of conducting material secured to said shaft and arranged in inductive relation to said polar projections, and an energizing coil surrounding said magnetic structure and said shaft.

2. An alternating-current motor comprising a magnetizable core structure having a series of poles, a revoluble shaft the axis of which is parallel to that of said poles, a closed secondary member surrounding alternate poles, a plate of conducting material secured to said shaft and arranged in inductive relation to said poles, and an energizing coil surrounding said magnetizable structure and said shaft.

3. An alternating-current motor comprising a revoluble shaft, a magnetizable core structure having a plurality of pairs of longitudinally projecting poles arranged about said shaft, a closed secondary member surrounding certain of said poles, a disc of conducting material secured to said shaft and arranged in inductive relation to said poles, and a coil surrounding said magnetizable structure and said shaft.

4. An alternating-current motor comprising a primary member having a plurality of non-equidistant polar projections of like polarity, a movable secondary member, said polar projections being arranged longitudinally about the axis of said movable secondary member and inductively related to said secondary member, a closed secondary coil surrounding only alternate polar projections, and a single magnetizing coil for all of said polar projections.

5. An alternating-current motor comprising a magnetizable structure having at each end a plurality of longitudinal polar projections, a movable secondary member coacting with each group of polar projections, said polar projections being arranged about the common axis of, and inductively related to, said movable secondary members.

6. An alternating-current motor comprising a magnetizable structure having at each end a plurality of longitudinal polar projections, a movable secondary member, said polar projections being arranged about the axis of, and inductively related to, said movable secondary member, and means for varying the relations of certain of said polar projections to certain other polar projections.

7. A motor comprising a magnetizable structure having at each end a plurality of longitudinally-extending polar projections, a closed secondary member for surrounding alternate polar projections, and a movable secondary member arranged at each end of said structure and inductively related to said polar projections.

8. An electric motor embodying a magnetizable structure comprising two separated groups of laminations arranged at one end to form a plurality of pairs of longitudinally-extending polar projections, a rotatable shaft the axis of which is substantially coincident with that of said structure, and a single energizing coil surrounding said magnetizable structure.

9. An electric motor embodying a magnetizable structure comprising two spaced parallel groups of laminations, said structure being arranged at one of its ends to form a plurality of pairs of polar projections, an energizing coil surrounding said magnetizable structure, and a rotatable shaft between said groups, the axis of said shaft being substantially coincident with that of said structure.

10. An electric motor comprising a magnetizable structure consisting of two groups of laminations spaced from each other, said structure terminating in a plurality of polar projections that are unequally spaced circumferentially with respect to the axis of said structure, an energizing coil surrounding said magnetizable structure, and a shaft extending parallel to said axis.

11. A motive device having a primary member provided with a plurality of longitudinally-extending polar projections, a conducting member having a plurality of openings through which certain of said polar projections extend, and a rotatable secondary member adjacent to said conducting member.

12. An alternating-current motor comprising a magnetizable structure having a plurality of adjacent pairs of longitudinally-extending polar projections, a conducting disc, said polar projections being arranged about the axis of, and in inductive relation to, said conducting disc, an energizing coil for said magnetizable structure, secondary coils mounted upon certain of the polar projections, and means for controlling the relative effects of the members of said pairs of poles.

13. An alternating-current motor comprising a movable member and a stationary member having a plurality of pairs of polar projections, and means for inducing eddy currents in adjacent angularly spaced portions of the respective members whereby torque is exerted upon said movable member, said means comprising a single energizing coil.

14. An alternating-current motor having a primary and a secondary member, said primary member having at one end a plurality of pairs of longitudinally-extending polar projections, a single energizing coil for said polar projections, and a closed secondary winding on one member of each pair, the secondary windings being equidistant from each other.

15. An alternating-current motor comprising a magnetizable core member having a plurality of oppositely-extending polar projections at the respective ends thereof, a closed secondary member surrounding certain of said polar projections, a movable member adjacent to each end of the core member and inductively related thereto, and means for energizing said core member.

16. An alternating-current motor comprising a revoluble shaft and means for applying torque thereto at points equiangularly spaced with respect to its axis, said means comprising a core member having a plurality of polar projections arranged about the axis of said shaft, a secondary member connected to said shaft and inductively related to said polar projections and means for modifying the normal inductive effect of alternate polar projections upon said secondary member.

17. An electric motor comprising a primary member having a unitary magnetizable portion provided with two groups of polar projections, a single energizing coil for said primary member, a rotatable member inductively related to each of said groups of polar projections, and means for operatively connecting said rotatable members.

18. An electric motor comprising a primary member having a magnetizable portion provided with a plurality of polar projections and having, also, a member of conducting material with openings therein through which certain of said projections extend to provide shading coils therefor, and a rotor coacting with said primary member.

19. An electric motor comprising a rotor of conducting material, a core structure having a plurality of longitudinally-extending polar projections, said rotor having inductively related thereto only the polar projections of said core structure of like polarity, said polar projections being arranged about the axis of said rotor, and a single magnetizing coil for said core structure.

In testimony whereof, I have hereunto subscribed my name this 12th day of October 1920.

GRANVILLE F. PACKARD.